United States Patent
Le Mer et al.

(10) Patent No.: US 9,476,610 B2
(45) Date of Patent: Oct. 25, 2016

(54) HOT FLUID PRODUCTION DEVICE INCLUDING A CONDENSING HEAT EXCHANGER

(75) Inventors: Joseph Le Mer, Plouezoch (FR); Rocco Giannoni, Milan (IT)

(73) Assignee: Giannoni France (FR)

(*) Notice: Subject to any disclaimer, the term of this patent is extended or adjusted under 35 U.S.C. 154(b) by 687 days.

(21) Appl. No.: 13/576,248

(22) PCT Filed: Jan. 31, 2011

(86) PCT No.: PCT/EP2011/051326
§ 371 (c)(1),
(2), (4) Date: Jul. 31, 2012

(87) PCT Pub. No.: WO2011/092332
PCT Pub. Date: Aug. 4, 2011

(65) Prior Publication Data
US 2012/0312513 A1  Dec. 13, 2012

(30) Foreign Application Priority Data
Feb. 1, 2010 (FR) .................................... 10 50695

(51) Int. Cl.
*F24D 19/00* (2006.01)
*F24H 8/00* (2006.01)
(Continued)

(52) U.S. Cl.
CPC *F24H 8/00* (2013.01); *F24H 1/43* (2013.01); *F24H 1/52* (2013.01); *F24H 8/006* (2013.01); *F24H 9/0026* (2013.01); *F28D 7/0083* (2013.01); *F28D 7/024* (2013.01); *Y02B 30/102* (2013.01); *Y02B 30/106* (2013.01)

(58) Field of Classification Search
USPC ............................. 122/6 R, 18.1; 126/350.1
See application file for complete search history.

(56) References Cited

U.S. PATENT DOCUMENTS 4,429,830 A * 2/1984 Forster et al. .................. 237/19
2006/0219395 A1* 10/2006 Le Mer et al. ............... 165/163
(Continued)

FOREIGN PATENT DOCUMENTS

DE     8530184 U1     5/1986
EP     0678186 A1    10/1995
(Continued)

OTHER PUBLICATIONS

International Search Report for Application No. PCT/EP2011/051326 dated Jul. 7, 2011.
(Continued)

*Primary Examiner* — Alissa Tompkins
*Assistant Examiner* — John Bargero
(74) *Attorney, Agent, or Firm* — Lerner, David, Littenberg, Krumholz & Mentlik, LLP (57) ABSTRACT

The invention relates to a device that includes means for conveying or producing hot gases and a condensing heat exchanger including: an bundle of helical tubes serving as primary exchanger, mounted within a gas-impermeable housing and equipped with a gas discharge trunk, means for circulating a primary fluid in the primary exchanger, two deflector plates and a deflecting ring arranged so as to circulate the hot gasses through the coils of the primary exchanger. Said device is characterized in that it includes a second tube bundle serving as a secondary exchanger, means for circulating therein a secondary fluid separate from the primary fluid and in that the second deflector plate is inserted between the primary exchanger and the secondary exchanger. The invention can be used in the production of heating water and of hot water for sanitation.

13 Claims, 5 Drawing Sheets

(51) Int. Cl.
*F24H 1/43* (2006.01)
*F24H 1/52* (2006.01)
*F24H 9/00* (2006.01)
*F28D 7/00* (2006.01)
*F28D 7/02* (2006.01)

(56) References Cited

U.S. PATENT DOCUMENTS

2007/0209606 A1 9/2007 Hamada et al.
2009/0090496 A1* 4/2009 Blomgren ................... 165/166

FOREIGN PATENT DOCUMENTS

| EP | 1281919 | A2 | 2/2003 |
| FR | 2846075 | A1 | 4/2004 |
| FR | 2850451 | A1 | 7/2004 |
| FR | 2854229 | A1 | 10/2004 |
| FR | 2942866 | B1 | 2/2012 |

OTHER PUBLICATIONS

French Search Report for Application No. FR1050695 dated Sep. 14, 2010.

* cited by examiner

HOT FLUID PRODUCTION DEVICE INCLUDING A CONDENSING HEAT EXCHANGER

CROSS-REFERENCE OF RELATED APPLICATIONS

The present application is a national phase entry under 35 U.S.C. §371 of International Application No. PCT/EP2011/051326 filed Jan. 31, 2011, published in French, which claims priority from French Patent Application No. 1050695 filed Feb. 1, 2010, all of which are incorporated herein by reference.

The present invention relates to a device for producing hot fluids, which notably comprises a condensing heat exchanger for heating up several fluids and means for producing a hot gas, such as a burner, in particular a gas or fuel oil burner or means for bringing a hot gas produced beforehand by an outer source.

This device is notably intended for fitting out a gas boiler for domestic or industrial applications, for example with view to feeding a central heating circuit and/or providing water for sanitation.

The heat exchanger of said device is of the type comprising a housing which delimits an enclosure inside which is accommodated at least one bundle of tube(s) as described for example in document EP-B-0 678 186, to which a reference may be made if necessary.

In document EP-B-0 678 186 a heat exchanger element is described, which consists in a tube in a thermally good conducting material, in which a heat transfer fluid, for example water to be heated up, is intended to circulate.

This tube is wound helically and has a flattened and oval cross-section, the major axis of which is substantially perpendicular to the axis of the helix, and each turn of the tube has planar faces which are separated from the faces of the adjacent turn by an interstice with constant width, this width being substantially smaller than the thickness of said cross-section, the spacing between two neighboring turns being further calibrated by means of spaces, which are formed by bosses formed in the wall of the tube.

This document also describes heat exchangers including several elements as described above, which are laid out in different ways in the various discussed embodiments.

A thereby defined exchanger element is capable of ensuring highly efficient heat exchange between very hot gases which may be directly generated by a burner mounted in the enclosure, or may stem from an outer source, which "lick" the tubular element, on the one hand and a fluid to be heated up, such as water, which circulates inside the latter, on the other hand.

Indeed, when it passes through the interstice between the turns, along an approximately radial direction, the flow of hot gases comes into contact with a relatively extensive surface of the wall of the exchanger element.

FIG. 20 of document EP-B-0 678 186 thus shows a heat exchanger which comprises a bundle of helically wound tubes, acting as a primary exchanger, means for circulating a single primary fluid therein, a burner capable of generating hot gases, a ceramic disc attached to the end of this burner and inside the bundle of tubes so as to divide the latter into two compartment portions and a ring-shaped obturator positioned on the outside of the bundle of tubes.

With such an exchanger, by means of two baffles formed by the disc and the obturator, it is possible to have hot gases successfully circulate from the inside of the primary bundle outwards, and then downstream from the disc and upstream from the obturator from the outside inwards, and finally have them then escape through the discharge trunk for cooled gases.

However, in the aforementioned document, provision is made for only heating up a single fluid by means of a single heat source. Now, in certain applications, it may be useful to heat up at least two fluids, for example water for sanitation and water for a heating circuit of a building.

The condensing heat exchanger, described in document FR 2 854 229, actually allows heating up of a primary fluid and of a secondary fluid.

However, it is designed for recovering the heat of an additional hot gas from a second heat source, for example the exhaust of an engine. By recovering calories present in these exhaust gases, it is thus possible to improve the overall efficiency of the heat exchanger.

For this purpose, it comprises a gas-impermeable housing, inside which are mounted a gas or fuel oil burner, and two bundles of coaxial tubes, made in a thermally good conducting material, one of which acts as a primary exchanger and the other as a secondary exchanger, each of these bundles consisting in a tube or in a group of tubes positioned end-to-end and helically wound. Further, means are provided for having two distinct fluids to be heated up, said to be "primary" and "secondary" fluids, respectively, in particular cold water, circulate inside said constitutive tube(s) of said primary bundle and of said secondary bundle, respectively.

According to a specific arrangement of this exchanger, two deflector plates are inserted between the primary bundle and the secondary bundle and are positioned parallel, side-by-side, with a certain spacing so that one closes one end of the primary bundle and the other one closes the adjacent end of the secondary bundle. Both of these plates thereby define a space inside which circulates an additional hot gas, brought from an outer conduit connected on the housing.

This additional hot gas thus participates in heating up the secondary fluid while crossing the turns of the bundle of tubes of the secondary exchanger.

However, the presence of the second deflector plate (downstream plate) is only justified by the fact that it delimits with the first a space for receiving the additional hot gas. As regards the hot gas flow from the burner, the pair of plates is equivalent to a single deflector plate and this flow of hot gases will circulate radially from the inside towards the outside of the primary bundle at the burner, and then axially outside the winding by circumventing the assembly formed by both plates and finally, radially from the outside towards the inside of the secondary bundle, where the secondary fluid circulates.

The person skilled in the art therefore had no reason to seek in this document FR 2 854 229, a teaching allowing him/her to solve his/her technical problem, i.e. at best benefit from the residual heat present in the gases from the first heat source (notably from the burner) for heating up—or pre-heating—a second fluid, for example, sanitation water.

A heat exchanger having technical characteristics such as those mentioned in the preamble of claim 1, is known from document US 2007/209606.

However, such an exchanger does absolutely not allow heating up of a secondary fluid, distinct from the primary fluid. Accordingly, it does not comprise any secondary exchanger, or any means for circulating a secondary fluid, or any deflector plate inserted between the primary exchanger and the secondary exchanger.

Finally, a device for producing two hot primary and secondary fluids is also known from document DE-8 530 184.

However, this device does not comprise a condensing heat exchanger compliant with the one of claim 1, and notably does not comprise any deflector plate positioned between a primary bundle and a secondary bundle.

The object of the invention is therefore to provide a device for producing hot fluids comprising a condensing heat exchanger and for which the overall efficiency is improved.

Another object of the invention is to increase this overall efficiency while applying means which burden very little the cost price of the exchanger and do not increase the bulkiness in a too significant way.

Still another object is to provide a device which is easy to make in large series and able to be easily adjustable, so as to be able to cope with the different needs of customers both as regards the heat transfer capacity and the amounts of the different fluids to be heated up and as regards bulkiness.

For this purpose, the invention relates to a device for producing hot fluids, comprising means for conveying or means for producing hot gases and a condensing heat exchanger which comprises:

a bundle of tubes acting as a primary exchanger, this bundle consisting in one tube, or in a group of tubes positioned end-to-end, forming a helical winding, in which the wall of the tube(s) is made in a thermally good conducting material, this bundle being fixedly mounted inside a gas-tight housing, and provided with a gas discharge trunk, a first deflector plate, made in a heat-insulating and heat-refractory material, for example based on ceramic, inserted between two consecutive turns of said primary bundle, this first deflector plate being centered on the axis of the helix and closing a portion of the inner space of said primary bundle, a discoidal deflecting ring positioned around the bundle of tubes acting as a primary exchanger, downstream from said first deflector plate relatively to the direction of circulation of said hot gases, this deflecting ring being attached at its outer periphery to said housing and at its inner periphery to one of the turns of said primary exchanger, a second deflector plate centered on said helix axis, both deflector plates and the deflecting ring being thus laid out so that the hot gases first cross radially, or approximately radially, a first portion of the primary exchanger, located upstream from the first deflector plate, by crossing the interstices separating its turns from the inside outwards, and then a second portion of the primary exchanger extending between the first deflector plate and the deflecting ring by crossing the interstices separating its turns from the outside inwards, and then the last portion of the primary exchanger extending between the deflecting ring and the second deflector plate by crossing the interstices separating its turns from the inside outwards, said device for producing hot fluids further comprising means for circulating a fluid to be heated up, a so-called "primary" fluid, in particular cold water, inside the constitutive tube(s) of the bundle which acts as a primary exchanger, the circulation of this primary fluid being carried out in an opposite direction to that of said hot gases.

According to the invention, said condensing heat exchanger comprises a second bundle of tubes acting as a secondary exchanger, fixedly mounted inside said housing coaxially with the first bundle of tubes and placed at the end of the latter, this second bundle also consisting in a tube, or in a group of tubes positioned end-to-end, forming a helical winding, in which the wall of the tube(s) is made in a thermally good conducting material, said second deflector plate is inserted between the primary bundle and said secondary bundle, this second deflector plate closing the inner space of said secondary bundle, so that said hot gases cross the secondary exchanger, by passing through the interstices separating its turns from the outside inwards, before being finally discharged on the outside at low temperature, via said gas discharge trunk, and said device for producing hot fluids comprises means for separately circulating at least one fluid to be heated up, a so-called "secondary" fluid, distinct from the primary fluid, inside the tube(s) of said secondary bundle, the circulation of this secondary fluid also being carried out in an opposite direction to that of said hot gases.

According to other advantageous and non-limiting features of the invention, taken alone or as a combination:

said means for producing hot gases are a gas or fuel oil burner;

said deflecting ring is attached between the turns of the primary bundle and the inner wall of the housing, so as to separate the ring-shaped space made between the outer face of the bundles of tubes and the housing, into two areas, and this in a gas-tight way;

said deflector plates are discs attached to the turns of the primary and secondary bundles, so as to obturate the inner space of the bundles in a gas-tight way;

the inner space of said first portion of the primary exchanger, a so-called "combustion chamber", is obturated at one end by the first deflector plate and at its other end, by a frontage provided with a gate crossed by said means for conveying or producing hot gases;

the inner space of the bundle which acts as a secondary exchanger, a so-called "discharge chamber" is obturated at one end by the second deflector plate and is connected at its other end to said trunk for discharging cooled gases;

both deflector plates and the discoidal deflecting ring are positioned parallel with each other on the one hand and perpendicularly to the axis of the helical winding of the bundles of tubes on the other hand;

the width of the interstice separating two adjacent turns of the bundles of tubes acting as a primary exchanger and secondary exchanger is constant and notably smaller than the thickness of the cross-section of the tubes making up these bundles;

the wall of the tubes of the bundles has a flattened and oval cross-section, the major axis of which is perpendicular or approximately perpendicular to that of the helix;

said housing is made in a heat-resistant plastic material and said heat exchanger comprises means for mechanically restraining said bundles of coaxial tubes along their axial direction, such as a set of tie-rods positioned on the outside of the bundles, parallel to the axis of the helix and the ends of which are firmly attached to supporting elements applied against both opposite ends of these bundles placed end-to-end, these restraining means being capable of absorbing thrust forces resulting from the internal pressure of the fluids which circulate in said tubes and which pressure tends to deform the walls thereof, by avoiding transmission of these forces to the housing;

said housing is made in a heat-resistant plastic material, and said heat exchanger comprises a ferrule positioned inside said housing and on the outside of the tube bundle acting as a primary exchanger, over a length at least extending facing the first portion of the primary exchanger, this ferrule ensuring a thermal screen function capable of insulating the housing from the heat emitted by the hot gases;

the device comprises a second heat exchanger, mounted in series with said condensing heat exchanger, so that the primary fluid outlet of the condensing exchanger is connected to the inlet mouth of the primary circuit of the second exchanger and the primary fluid outlet mouth of the second exchanger is connected to the primary fluid inlet of the condensing exchanger on the one hand and so that the secondary fluid outlet of the condensing exchanger is connected to the inlet mouth of the secondary circuit of the second exchanger and the secondary fluid outlet mouth of the second exchanger is connected to the point for drawing said secondary fluid, the hot primary fluid circulating inside said second exchanger, flowing as a counter-current to the secondary fluid preheated in the condensing exchanger;

the second exchanger is an exchanger with plates;

the device comprises a three-way valve, the first way of which is connected to the primary fluid outlet mouth of the second exchanger and the second way to the circulation means themselves connected to the inlet of the primary circuit of the condensing exchanger, and it also comprises a T-shaped fitting, two branches of which are respectively connected to the primary fluid outlet of the condensing exchanger and to the inlet mouth of the primary circuit of the second exchanger, the third way of the valve and the third branch of the T-shaped fitting being capable of being connected to both ends of a network for circulation of heating water, for example of central heating.

Other features and advantages of the invention will become apparent from the description which will now be made thereof, with reference to the appended drawings, which illustrate, as an indication but not as a limitation, several possible embodiments.

The exchanger 1 illustrated in the figures includes a shell, or housing 10 which delimits an enclosure inside which a double tubular bundle 2 is fixedly mounted, which consists in two bundles of coaxial tubes placed end-to-end, one (2*a*) of which acting as a primary exchanger and the other (2*b*) as a secondary exchanger.

This enclosure approximately has a general cylindrical shape, with a horizontal axis X-X'.

Figure 1:
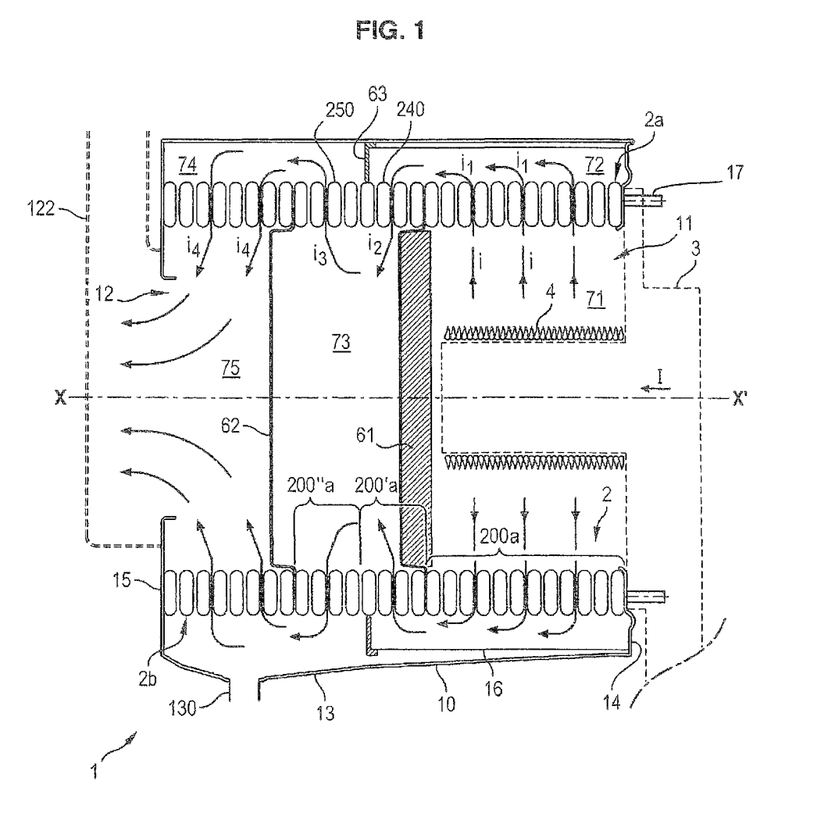
FIG. 1 is a schematic front view of a first embodiment of the condensing exchanger and of the gas burner of the device object of the invention, as a section along a middle vertical plane referenced as I-I in FIG. 3.
Figure 2:
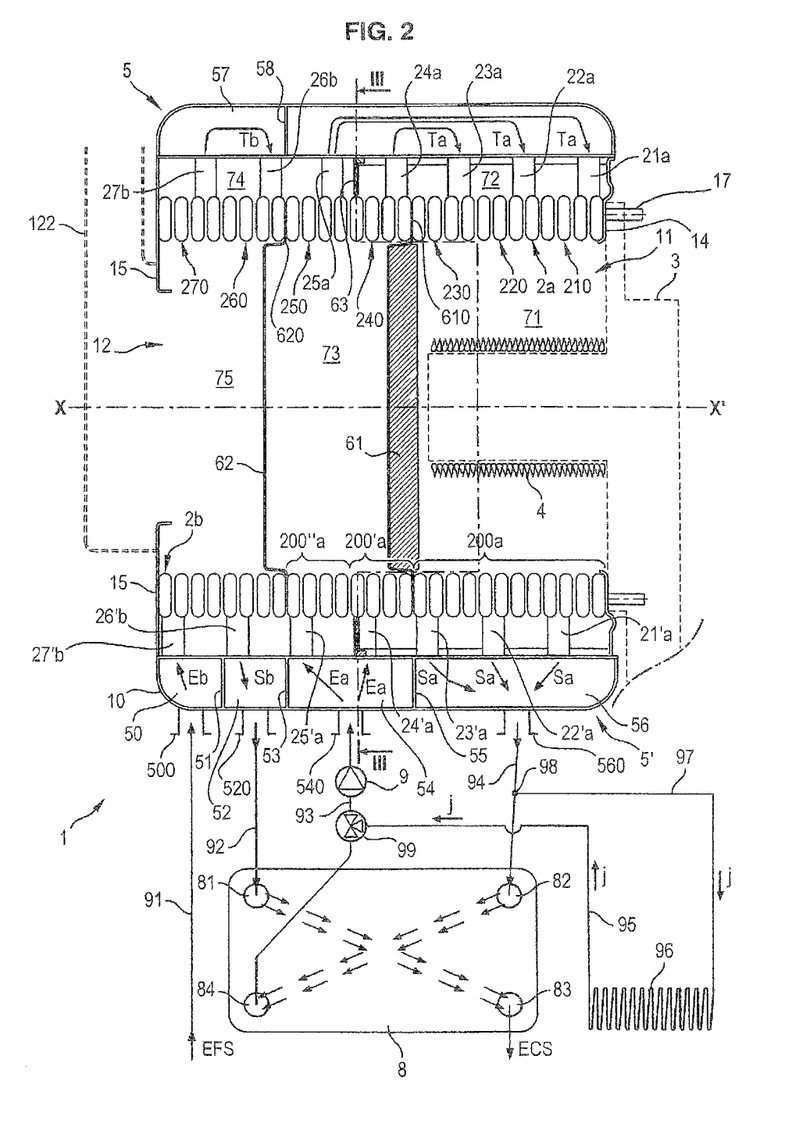
FIG. 2 is a schematic view of the device for heating several fluids, object of the invention, which includes a front view of the exchanger of FIG. 1, as a section along a broken plane referenced as II-II in FIG. 3.

In the embodiment illustrated in FIGS. 1 and 2, the bundle 2*a* consists in a group of five adjacent tubes forming a helical winding, of axis X-X', while the other bundle 2*b* consists of two adjacent tubes, also wound helically, and with an axis X-X'.

The five tubes forming the bundle 2*a* and the two tubes forming the bundle 2*b* are identical, with the same length and the same diameter. The bundle 2*a* therefore has an axial dimension two and a half times larger than that of the bundle 2*b*.

These are tubes with a flattened cross-section, the large sides of which are perpendicular to the axis X-X'.

Bosses (not shown) provided on the large faces of these tubes play the role of spacers, giving the possibility of delimiting between each turn, an interstice with a calibrated, substantially constant value.

Each primary 2*a* and secondary 2*b* bundle is intended to be interiorly crossed by at least one fluid to be heated up, which for example is water.

In the embodiment illustrated in FIG. 2, both helicoidal tubes of the secondary bundle 2*b*, (referenced as 260 and 270), are connected in series, the fluid to be heated up being a single fluid, for example sanitary water, which flows from left to right upon examining FIGS. 1 and 2. This fluid is called hereafter a "secondary fluid" with reference to the bundle in which it circulates.

Moreover, the five helicoidal tubes of the main bundle 2*a*, (referenced as 210, 220, 230, 240 and 250), are respectively connected as a group of two and as a group of three in parallel, and both groups are connected in series, the fluid to be heated up being a single fluid, for example water intended for heating premises. The fluid also circulates from left to right if FIGS. 1 and 2 are considered. It is called hereafter a "primary fluid".

Side collectors 5 and 5', which are attached to the housing 10, conventionally allow connection of the apparatus, respectively on two conduits for conveying the cold primary and secondary fluids to be heated up and on two conduits for discharging these same heated-up fluids.

These collectors also allow transfer of these fluids from one tube to the next. They are only visible in FIGS. 2 to 5.

Each tube or tubular elements has right end portions, i.e. with a rectilinear axis and a gradually variable section, the opening end portion of which is circular.

These opening end portions are respectively referenced as 21*a* to 25*a* and 21'*a* to 25'*a* for the tubes of the primary bundle 2*a* and 26*b*, 27*b*, 26'*b* and 27'*b* for the tubes of the secondary bundle 2*b*.

The rectilinear inlet and outlet end portions of each tube are parallel and extend in a same vertical plane, tangent to the winding (see FIG. 3), their mouths being directed opposite to each other, according to an arrangement in accordance with the one illustrated in FIG. 24 of European patent 0 678 186 already mentioned.

The inlet and outlet mouths of the tubular elements are suitably and sealably crimped in suitable apertures provided in the housing 10, in order to open out inside the collectors 5, 5'.

The inlet-outlet collector 5' comprises four adjacent chambers separated by three internal partitions 51, 53 and 55, i.e. one secondary fluid inlet chamber 50 provided with an endpiece 500, a secondary fluid outlet chamber 52 provided with an endpiece 520, a primary fluid inlet chamber 54 provided with an endpiece 540 and an outlet chamber 56 for this primary fluid provided with an endpiece 560.

The endpieces 500 and 520 are intended to be connected onto a pipe 91 for conveying the secondary fluid to be heated up and respectively to a tube 92 for discharging the heated-up secondary fluid.

The endpieces 540 and 560 are intended to be connected onto a pipe 93 for conveying the primary fluid to be heated up and respectively a pipe 94 for discharging the heated-up primary fluid.

The chamber 50 is connected to the inlet end portion 27'$b$ of the tube 270 and the chamber 52 to the outlet end portion 26'$b$ of the tube 260 of the bundle 2$b$.

The chamber 54 is connected to the inlet end portions 24'$a$ and 25'$a$ of both tubes 240 and 250 of the primary bundle 2$a$, into which the primary fluid to be heated up flows; the chamber 56 is connected to the outlet end portions 21'$a$, 22'$a$ and 23'$a$ of the three tubes 210, 220 and 230 of the primary bundle 2$a$, through which the heated up primary fluid flows out.

The opposite collector 5 has two transfer chambers 57 and 59, separated by a partition 58.

The transfer chamber 57 is connected both to the outlet 27$b$ and inlet 26$b$ end portions of both elements of the secondary bundle 2$b$, 2$a$, and the transfer chamber 59 is both connected to the outlet 24$a$ and 25$a$ end portions of the tubes 240 and 250 of the primary bundle 2$a$ and to the inlet end portions 21$a$, 22$a$, and 23$a$ of the three tubular elements 210, 220 and 230 of the bundle 2$a$.

In FIG. 2, arrows symbolize the path of the fluids flowing in these windings.

The primary flow (arrows Ea) entering through the endpiece 540 is subdivided into two flows which each flow through a (tube) winding 240, 250, join up in the chamber 59 and are transferred (arrows Ta) into the three other tubes 210, 220 and 230 for opening out (arrows Sa) into the chamber 56 and flowing out through the endpiece 560.

The circulation of this primary fluid is for example accomplished by means of a pump 9.

The inflowing secondary flow (arrow Eb) flows in via the endpiece 500, crosses the tube winding 270 and is then transferred (arrow Tb) through the chamber 57 into the neighboring winding 260 so as to open out (arrow Sb) into the chamber 52 and to flow out through the endpiece 520.

The housing 10, just like the tube(s) 210 to 270, may be in metal, notably in stainless steel.

However, it is advantageously made in plastic material, as this is provided in documents FR 2 846 075 and FR 2 850 451.

For example it is made by roto-molding or by injection molding.

The housing is for example made with two half shells which are heat-welded to each other after having installed the tubular bundles inside one of them.

The housing 10 is open at its two ends, located on the right and on the left, upon considering the view in FIGS. 1 and 2.

The opening made in the front wall 14 of the housing 10 bears reference 11 and the one made in the rear wall 15, reference 12.

During the use of the apparatus, a portion of the steam (water vapour) contained in the burnt gases condenses upon contact with the walls of the tubes 210 to 270.

Reference 13 designates the bottom wall of the housing 10; in a known way, this bottom is sloped, which allows discharge of the condensates towards an outlet orifice (plughole) 130.

The opening 12 is connected to a trunk 122 for discharging cooled gases.

Of course, the orifice 130 is connected to a conduit for discharging the condensates, while the trunk 122 is connected to a conduit for discharging fumes, for example a chimney conduit. These conduits are not illustrated in the figures.

Assuming that the housing 10 is in a plastic material, mechanical means for axial restraint of the bundles of tubes 2$a$, 2$b$ of the kind described in both aforementioned documents FR 2 846 075 and FR 2 850 451 are provided.

With these means, it is possible to absorb the axial thrust forces resulting from the internal pressure of the fluid which circulates in the tubes and which tends to deform the walls thereof, by avoiding transmission of these forces to the housing.

Both roles assigned up to now to the housing are thereby disassociated i.e. being used as an enclosure for the circulation and discharge of hot gases, as well as for collecting and discharging the condensates on the one hand, and ensuring mechanical strength of the bundle of tubes on the other hand.

These mechanical restraining means (tie-rods) are referenced as 17.

Further, the bundles of tubes are preferably surrounded by a ferrule 16 forming a thermal screen, so as to avoid that the housing 10 be directly exposed to hot gases, according to an arrangement similar to the one described in document FR 2 850 451.

The arrangement of this ferrule will be described later on.

The opening 11 located on the front side of the housing is obturated by a frontage element 3, only illustrated in dotted lines, for the sake of simplification.

In a way known to the person skilled in the art, this frontage element is attached to the housing in a gas-tight way.

It is normally obturated by a removable gate, provided with a central opening, crossed by a burner 4, for example a gas (or even fuel oil) burner. The burner 4 is firmly attached to the gate.

For the structure of the gate, reference may be for example made to the one described in the aforementioned document FR 2 854 229.

According to another alternative embodiment, the gate may also be made so as to have the structure described in French patent application No. 09 51422 of Mar. 6, 2009, to which reference may be made.

In this case, the gate comprises a pair of metal sheets firmly attached to each other at their periphery, the internal metal sheet being provided with an opening in which a burner is positioned and the external metal sheet being connected to a system for bringing a combustible gas to said burner. A deflector plate itself comprising two walls spaced apart and acting as a heat shield, is inserted into the space made between both metal sheets of the gate, in order to limit heat losses through the gate and avoid risks of burns upon contact with the latter, especially during maintenance interventions on the apparatus by specialized personnel.

With suitable means connected onto the burner 4, a mixture of combustible gas and air such as propane and air may notably be brought to the apparatus via a conduit.

These means may comprise a fan, not shown, capable of blowing the gas mixture into the burner.

The burner 4 is a cylindrical tube with a closed end, the wall of which is pierced with a multitude of small holes which allow the combustible mixture to be let through, radially from the inside towards the outside of the tube.

The outer surface of this wall forms the combustion surface.

An ignition system of a known type, not shown, for example including an electrode generating a spark, is of course associated with the burner.

The latter is positioned coaxially in the middle of the winding of the bundle 2$a$ acting as a primary exchanger, but it does not extend over the whole of its length. It is only located inside a portion of this bundle 2a, designated hereafter as "first portion of the primary exchanger" referenced as 200a. In the exemplary embodiment illustrated in FIGS. 1 and 2, this first portion 200a thus comprises three windings of tubes 210, 220 and 230.

Although this is not illustrated in the figures, the burner 4 may of course be replaced with a flat burner, the combustion surface of which would be perpendicular to the axis X-X' or else slightly convex.

According to the invention, the inner space of the first portion to 200a of the bundle of tubes 2a is obturated at its front end by the frontage element 3 and the gate which is associated with it and with its front end by a deflector plate 61.

This deflector plate 61 is formed by a disc in a heat-insulating and heat-refractory material, for example based on ceramic; it is supported by a discoidal frame as a thin plate 610, in stainless steel of larger diameter.

The frame 610 is attached between the last turn of the tube 230 and the first turn of the neighboring tube 240.

The first portion 200a of the tube bundle 2a is thus axially confined between the front wall 14 and the deflector plate 61, the frame 610 of which is fixed against its last turn.

A second deflector plate 62, preferably thermally non-insulated, is attached between the last turn of the primary bundle 2a, here the last turn of the tube 250, on the rear side (on the left in FIGS. 1 and 2) and the first turn of the secondary bundle 2b, here the first turn of the tube 260, on the front side of the exchanger.

Similarly, this second deflector plate 62 is formed by a disc supported by a discoidal frame as a thin plate 620, in stainless steel, of larger diameter.

Although this is not illustrated, it may also consist of a heat-insulating and heat-refractory material.

The secondary bundle 2b is thus axially confined between the rear wall 15 of the housing 10 and the deflector 62, the frame of which 620 is attached against its last turn.

The first and second deflector plates are therefore centered on the axis X-X' and parallel with each other.

Preferably, the deflector plates 61 and 62 are attached to the turns in a gas-tight way.

Finally, a discoidal deflector ring 63, is attached around the primary bundle 2a, i.e. on the outside of the latter and inside the housing 10. It is either formed from a thin metal sheet or in a plastic heat-resistant material and consisting of two half rings for example assembled by crimping.

It extends in a general plane parallel to that of the deflector plates 61 and 62, is centered on the axis X-X' and is axially positioned between the deflector plates 61 and 62.

Figure 3:
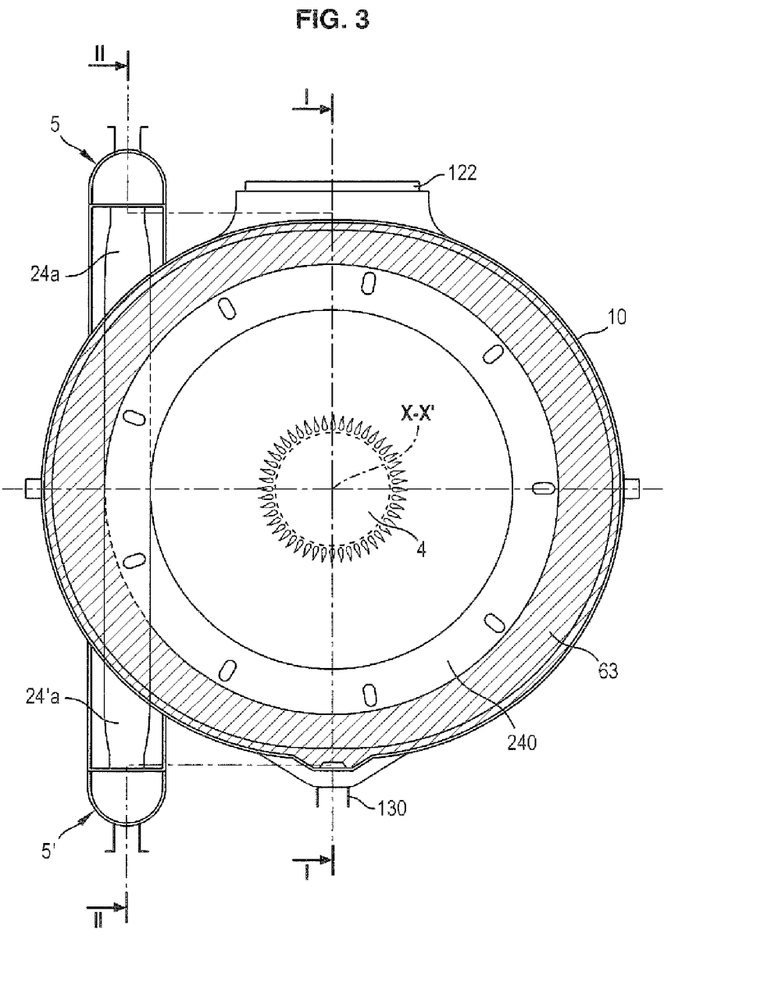
FIG. 3 is a side view of the exchanger, as a section along the broken plane referenced as III-III in FIG. 2.

This deflecting ring 63 is supported both on the small outer side of one of the turns, here the last turn (on the left in FIGS. 1 and 2) of the fourth tube 240 and on the inner wall of the housing 10, for example by means of a few molded guides in the housing 10 and not illustrated in the figure for the sake of simplification (see also FIG. 3).

Preferably, this attachment is made so as to be gas-tight, for example by using a seal gasket, so that the ring-shaped space extending between the outside of the bundles of tubes 2a and 2b and the inner wall of the housing 10 is split into two portions which do not communicate directly.

The portion of the primary bundle 2a which extends axially between the deflector 61 and the deflecting ring 63 is called hereafter a "second portion" 200'a. In the illustrated embodiment, it corresponds here to the sole fourth tube 240.

Similarly, the portion of the primary bundle 2a which extends axially between the deflecting ring 63 and the deflector 62 is designated hereafter as a "third portion" 200"a, it corresponds here to the sole fifth tube 250.

As this may be seen in FIGS. 1 and 2, the ring-shaped ferrule 16 is axially blocked between the front wall 14 of the housing 10 and the deflecting ring 63.

The shape of this ferrule is of course adapted so as to let through the different opening ends 21a to 24a and 21'a to 24'a which cross it for joining the collectors 5, 5'.

This ferrule 16 is thus positioned facing the first and second portions 200a and 200'a of the primary bundle 2a which form the hottest areas of the exchanger.

Both deflector plates 61, 62 and the deflecting ring 63 form a series of three baffles on the path of the combustion gases.

Inside the winding of tubes, the space containing the burner 4 will be designated subsequently in the description as "combustion chamber 71", the latter extending between both deflector plates 61 and 62, as a "intermediate chamber 73", and the one extending between the plates 62 and the trunk 122, as a "discharge chamber 75".

The ring-shaped areas extending on the outside of the bundle of tubes and inside the housing 1 are respectively referenced as 72, for the one located between the front partition 14 and the ring 63, and 74 for the one located between the ring 63 and the rear partition 15.

With reference notably to FIGS. 1 and 2, we shall now explain the operation of this exchanger.

The primary fluid to be heated up, cold water for example, is circulated by the pump 9.

A combustible gas mixture, symbolized by the arrow I, is brought to the burner 4.

The burner 4 having been ignited, the hot gases (combustion products) are generated by the latter in the combustion chamber 71. They form the single source of hot gases used for heating up the primary fluid and the secondary fluid, as described hereafter.

These gases first of all radially cross the first portion 200a of the primary bundle 2a, by passing between the interstices separating the turns of the tubes 210, 220 and 230, from the inside outwards (arrows i); they cannot escape axially because of the presence of the deflector plate 61.

In the combustion chamber 71, the gases are at a temperature of the order of 950° C. to 1,000° C. After passing through the portion 200a, these gases undergo first cooling so as to arrive in the ring-shaped area 72 at a temperature of the order of 100° C. to 140° C.

The gases then axially cross the area 72 (arrows i1), arrive in contact with the deflecting ring 63 and are deflected so as to radially cross the interstices separating the turns of the tube 240 (second portion 200'a of the bundle 2a), from the outside inwards (arrow i2).

They reach the intermediate chamber 73 at a temperature of the order of 85° C. to 90° C.

By the presence of the refractory material on the deflector plate 61, it is possible to prevent transmission of heat from the burner 4 to the intermediate chamber 73.

A third cooling of the gases is performed when the latter radially cross the turns of the tube 250 (third portion 200"a of the bundle 2a), from the inside outwards (arrow i3), and they cannot escape axially because of the presence of the deflector plate 62.

The gases reach the ring-shaped area 74 at a temperature always below 75° C., taking into account the previous coolings. This is important as this will be detailed subsequently.

A fourth cooling is performed when the gases pass through the interstices separating the turns of the secondary bundle 2b, from the outside inwards (arrows i4).

These gases reach the discharge chamber 75 where they are at a temperature comprised between about 15° C. and 35° C., or even between 15° C. and 25° C. Finally, they are discharged through the trunk 122.

The temperature of the combustion gases is lowered all along their path, as a result of heat transfer having occurred between these hot gases and the fluids flowing through the bundles 2a and 2b and which circulate as a counter-current relatively to the path of these gases.

The deflector plate 62 forms a third baffle on the path of the hot gases.

Its position is important. It should always be located between the primary bundle 2a and the secondary bundle 2b. It gives the possibility of significantly lowering the temperature of the gases reaching the area 74 and notably guaranteeing that the latter will always be less than 75° C.

The secondary fluid, for example water, present in the bundle 2b may either be stagnant, or circulating. In the case when it is stagnant, by the presence of the deflector plate 62, it is possible to prevent this secondary fluid from being brought to a very high temperature, which would risk leading to damaging, or even breaking of the tubes 260 and 270.

Further, in the case when this secondary fluid is sanitation water, this gives the possibility of avoiding the formation of limestone in the tubes of the secondary bundle 2b.

The aforementioned exchanger 1 is used in the device for producing at least two hot fluids, according to the invention.

Such a device is illustrated in FIG. 2 and it comprises, in addition to the aforementioned condensing heat exchanger 1, a second exchanger 8.

This second exchanger is for example an exchanger with plates, known to the person skilled in the art and which will therefore not be described in detail.

Briefly, such an exchanger consists of an assembly of superposed parallel plates which delimit two heat exchange enclosures, one with the primary fluid flowing through and the other one with the secondary fluid, both of these fluids circulating as alternate thin layers, with trajectories nested in each other.

The inflow and outflow of the primary fluid is accomplished through a pair of mouths 82, 84 respectively. Similarly, the inflow and outflow of the secondary fluid is accomplished with a pair of mouths 81, 83 respectively.

These mouths are made in an end plate in the stack, via "wells" or inlet and outlet chimneys crossing the internal plates and communicating with the interstitial spaces making up the corresponding enclosure.

The plates of the exchanger are thin metal plates, thermally good conductors, generally in stainless steel, which are stamped and assembled by welding or by a connection by means of bolted flanges, with interposition of rubber gaskets.

The total number of plates is generally comprised between ten and thirty for exchangers of domestic power.

The layout is designed so that both flows of fluids between which the heat exchange occurs follow a trajectory as a labyrinth and circulate as a counter-current relatively to each other, in order to promote this exchange.

The discharge pipe 92 of the secondary fluid which was preheated in the exchanger 1 is connected to the mouth 81, while the pipe 94 for discharging the primary fluid which has been heated up in the exchanger 1 is connected to the mouth 82.

Further, the mouth 84 is connected to the pump 9 via the admission pipe 93.

According to an alternative embodiment not shown, the second exchanger 8 may also be a flask intended for receiving the primary fluid and crossed by a coil in which circulates the secondary fluid, or vice versa.

The device for producing hot fluids further comprises a three-way valve 99.

This device may for example be connected to a central heating installation which comprises several radiators 96 (a single one of which is illustrated in FIG. 2) or to a heating flooring which comprises a coil-shaped tubing integrated into the floor.

In the illustrated example, the radiator 96 is connected to the three-way valve 99 through a duct 95 and to the pipe 94 via a duct 97 by a tapping or a T-shaped fitting 98.

The operation of the device is the following.

In the "heating of the primary fluid" mode, for example for feeding the radiators 96 with view to heating premises, the pump 9 and the burner 4 are operated and the three-way valve 99 is positioned so that the primary fluid circulates in the primary exchanger 2a, inside which it heats up until it reaches a certain temperature, for example 60° C., at the outlet of the endpiece 560, and then in the radiator 96 before returning via the duct 95 to the valve 99 and then again to the pump 9.

The path of the fluid in the central heating circuit is illustrated by the arrows j.

In the "sanitation water drawing" mode, a water-drawing tap not shown in the figures allows water to circulate in the secondary circuit. The cold sanitation water EFS penetrates into the secondary exchanger 2b through the endpiece 500, circulates in the tubes 270 and then 260, inside which it is heated up by heat exchange with the gases present in the chambers 74 and 75, flows out preheated via the discharge pipe 92, penetrates into the exchanger 8 from which it flows out at the desired temperature through the mouth 83, as hot sanitation water ECS.

Simultaneously, the switching to the "sanitation water drawing" mode causes actuation of the three-way valve 99 which switches to a position in which the return of the primary fluid from the duct 95 is impossible. The primary fluid which leaves the primary exchanger 2a is then directed towards the exchanger 8 from which it flows out through the mouth 84 after having transmitted its heat to the secondary fluid, before returning to the pump 9.

The heat exchanger 1 according to the invention and the device for producing hot fluids which includes it have particularly performing efficiencies as compared with the devices known from the prior art.

In traditional devices which associate a main heat exchanger only for heating up a primary fluid and an exchanger with plates for heating up a secondary fluid, by heat exchange with said primary fluid, the observed temperatures are the following:

cold sanitation water inflow temperature: 10° C.
hot sanitation water outflow temperature: 40° C.,
temperature of the primary fluid in the condensing exchanger: 60° C. to 80° C.,
outflow temperature of the fumes on the outside: 75° C. to 85° C.

The efficiency in this case is of the order of 96% to 97%.

Indeed, in this type of device, the outflow temperature of the fumes is conditioned by the temperature of the primary fluid, which remains high, consequently the fumes have a temperature which remains above the dew point which, itself is at a maximum of 55° C. Therefore there is no condensation in the main exchanger and no recovery of the latent heat contained in the fumes. The efficiency is therefore poor.

On the contrary in the device object of the invention, the observed temperatures are the following:
- cold sanitation water inflow temperature: 10° C.,
- hot sanitation water outflow temperature: 40° C.,
- inflow temperature of the preheated sanitation water in the mouth 81 of the exchanger 8: 19° C. to 20° C.,
- inflow temperature of the primary fluid in the endpiece 540: 45° C.,
- outflow temperature of the primary fluid in the endpiece 560: 68° C.,
- outflow temperature of the fumes on the outside: 18° C. to 25° C.

The efficiency in this case is of the order of 107% to 109%, or even 110%, i.e. greater by 10 to 12% as compared with the state of the prior art.

The device according to the invention gives the possibility of obtaining a double advantage.

On the one hand, it gives the possibility of recovering a maximum of the latent heat of the fumes, by a remarkable condensation phenomenon. Indeed, the cold sanitary water EFS which crosses the tubes 260 and 270 is at a very low temperature, of the order of 10° C. The combustion products and fumes which pass in the interstices between these tubes are themselves already at a low temperature, of the order of 60° C. to 75° C. in the chamber 74, since they are at their third passage through the tubes of the primary exchanger. Their fourth passage through the tubes 260 and 270 containing water at 10° C. further lowers their temperature, which explains the very good efficiency of the exchanger 1.

On the other hand, the fact that the secondary fluid is preheated in the exchanger 1 reduces the amount of energy required for bringing it to its final temperature.

Figure 4:
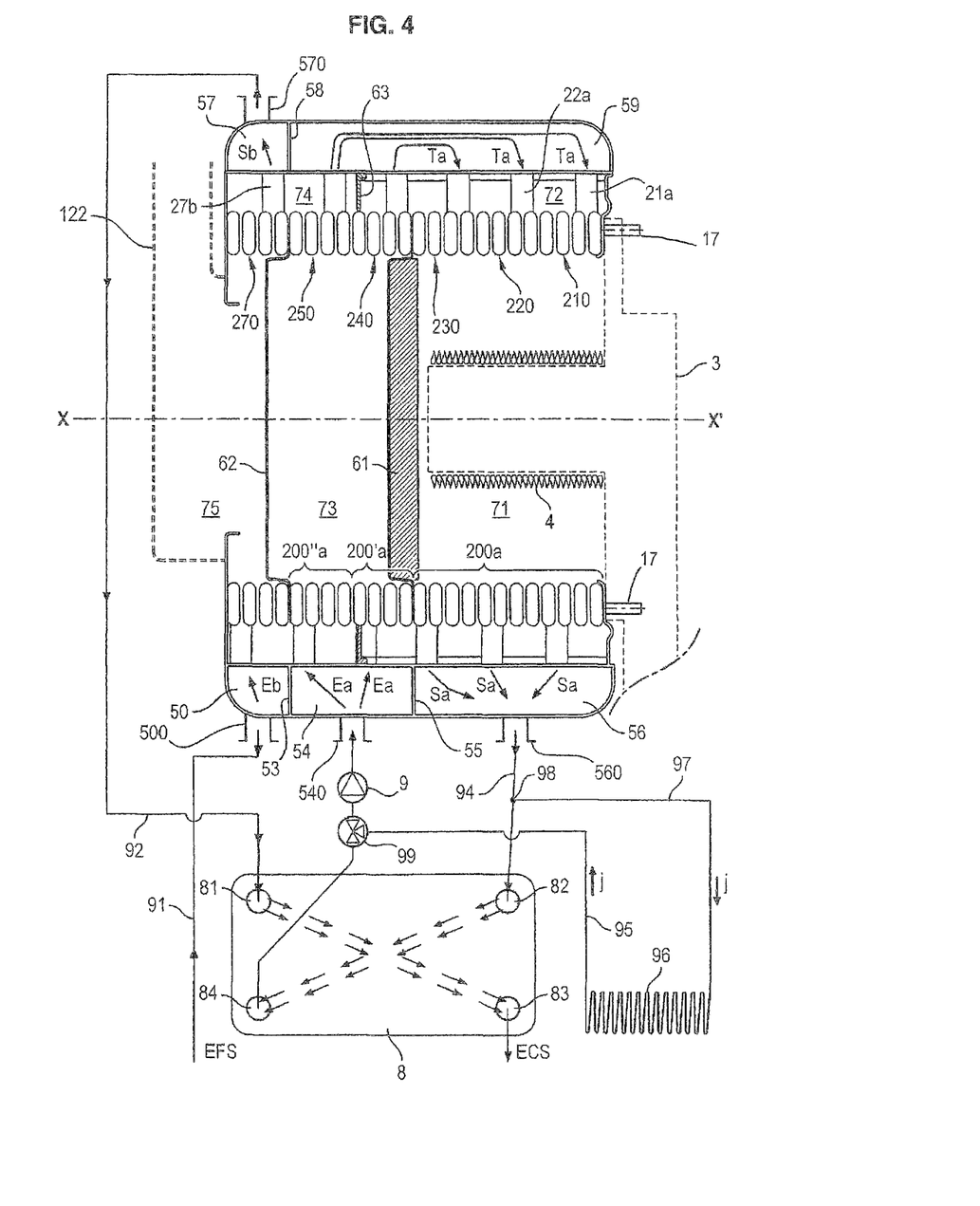
FIGS. 4 and 5 are similar views to FIG. 2, but which illustrate a second and third embodiment of the condensing exchanger, respectively.

A first alternative embodiment of the condensing heat exchanger is illustrated in FIG. 4.

The identical or similar elements to those of the first embodiment have been assigned the same reference numbers, and an explanation as to their nature and as to their function will not be given again.

This exchanger is distinguished from the preceding one by the fact that the secondary exchanger 2a only comprises a single tube 270 instead of two.

Consequently, the transfer chamber 57 is provided with an endpiece 570 which is connected to the discharge pipe 2 and the chamber 52 does not exist.

Figure 5:
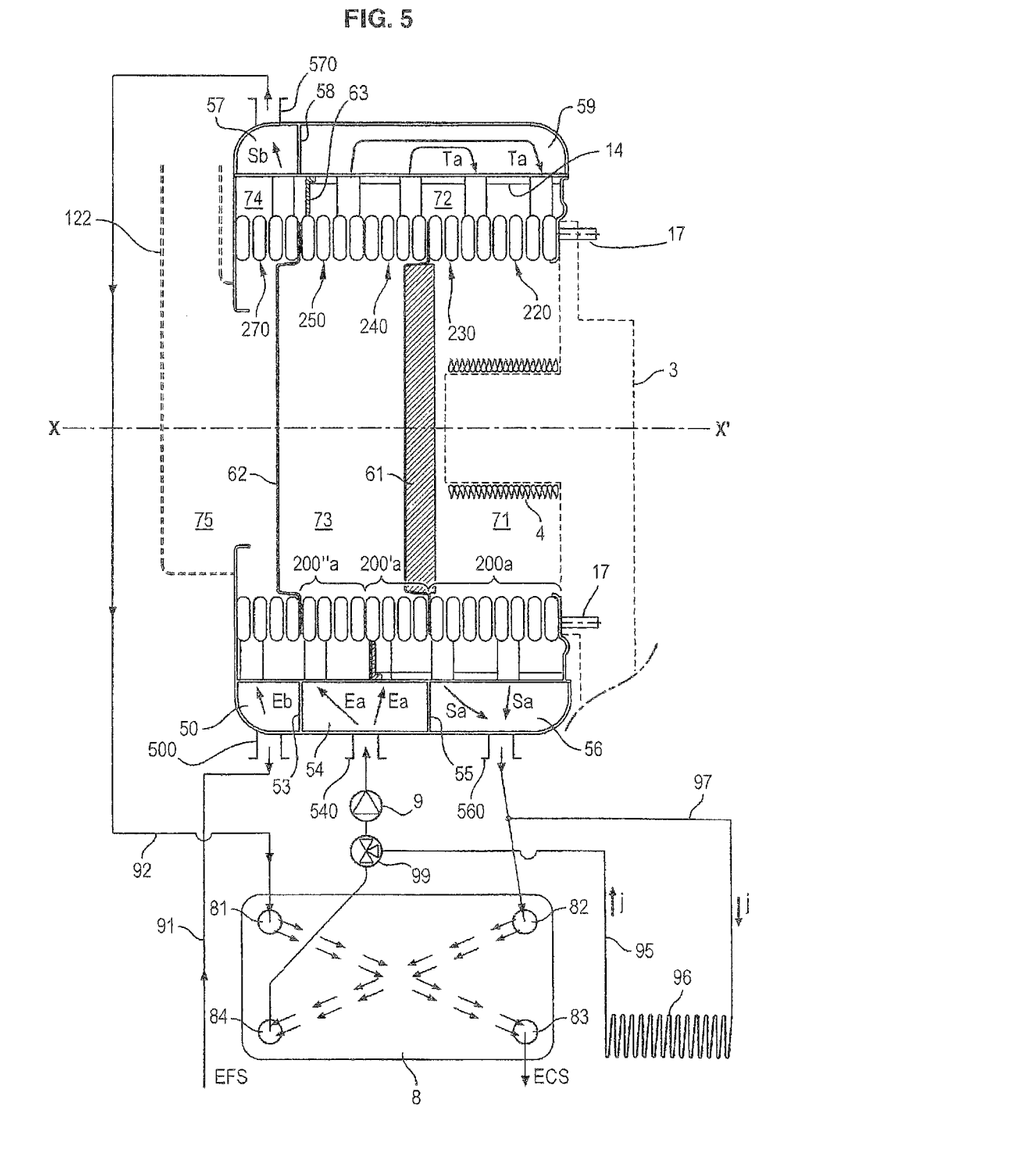

A second alternative embodiment of the condensing heat exchanger is illustrated in FIG. 5.

It is distinguished from the first alternative in that the first portion 200a of the primary bundle only comprises two tubes instead of three.

It is easily understood that the number of tubes of the different portions of the primary exchanger and of the secondary exchanger may be adapted depending on the needs of the user, provided that the plurality of deflector plates and the deflecting ring are retained, which allow cooling of the gases to the desired temperature.

The hot gas present in the combustion chamber 71 is not necessarily generated by a burner accommodated in the primary bundle. It may be provided from an outer source and be conveyed in the inside of the primary bundle by means of a conduit axially connected onto the partition 3 and which then forms an admission means for these gases.

The device according to the invention may be used for heating up other fluids, such as oil for example.

It is obvious that it is possible, without departing from the scope of the invention, to provide bundles of tubes, designed and connected in such a way that they allow more than two distinct fluids to be heated up.

The dimensions of the device, notably governed by the section, the diameter and the length of the tubular bundles, as well as—if necessary—by the type of applied burner will of course be adapted to the sought power and to the conditions of use.

Finally, it will be noted that the device may advantageously be equipped with a temperature probe suitable for stopping admission of hot gases when the probe detects a predetermined excessive temperature.

The invention claimed is:

1. A device for producing at least two hot fluids distinct from each other, including a primary fluid, in particular cold water, and a secondary fluid, said device comprising means for conveying or means for producing hot gases and a condensing heat exchanger which comprises:
   - a bundle of tubes acting as a primary exchanger, this bundle consisting in a tube, or in a group of tubes positioned end-to-end, forming a helical winding, in which the wall of the tube(s) is made in thermally good conducting material, this bundle being fixedly mounted inside a gas-tight housing provided with a gas discharge trunk,
   - a first deflector plate, made in a heat-insulating and heat-refractory material, for example based on ceramic, inserted between two consecutive turns of said primary bundle, this first deflector plate being centered on the axis X-X' of the helix and closing a portion of the inner space of said primary bundle,
   - a discoidal deflecting ring positioned around the bundle of tubes acting as a primary exchanger, downstream from said first deflector plate relatively to the direction of circulation of said hot gases, this deflecting ring being attached at its outer periphery to the inner wall of said housing and at its inner periphery to one of the turns of the primary exchanger, so as to separate the ring-shaped space made between the outer face of the bundles of tube(s) and the housing, into two areas and this in a gas-tight way,
   - a second deflector plate centered on said helix axis X-X',
   - both deflector plates and the deflecting ring being thus laid out so that the hot gases first cross radially, or approximately radially, a first portion of the primary exchanger located upstream from the first deflector plate, by crossing the interstices separating its turns from the inside outwards, and then a second portion of the primary exchanger extending between the first deflector plate and the deflecting ring by crossing the interstices separating its turns from the outside inwards, and then the last portion of the primary exchanger extending between the deflecting ring and the second deflector plate by crossing the interstices separating its turns from the inside outwards,
   - said device for producing at least two hot fluids further comprising means for circulating said primary fluid to be heated up inside the constitutive tube(s) of the bundle which acts as a primary exchanger, the circulation of this primary fluid being carried out in an opposite direction to that of said hot gases,
   - wherein said condensing heat exchanger comprises a second bundle of tubes acting as a secondary exchanger, fixedly mounted inside said housing coaxially with the first bundle of tubes and placed at the end of the latter, this second bundle also consisting in a tube, or in a group of tubes positioned end-to-end, forming a helical winding, in which the wall of the tube(s) is made in a thermally good conducting material, by the fact that said second deflector plate is inserted between the primary bundle and said secondary bundle such that one side of the second deflector plate is in direct contact with the primary bundle and other side of the second deflector plate is in direct contact with the secondary bundle, this second deflector plate closing the inner space of said secondary bundle, so that said hot gases cross the secondary exchanger, by passing through the interstices separating its turns from the outside inwards, before being finally discharged on the outside at low temperature, via said gas discharge trunk, and by the fact that said device for producing at least two hot fluids comprises means for separately circulating said secondary fluid to be heated up, inside the tube(s) of said secondary bundle, the circulation of this secondary fluid also being carried out in an opposite direction to that of said hot gases.

2. The device according to claim 1, wherein said means for producing hot gases are a gas or fuel oil burner.

3. The device according to claim 1, wherein deflector plates are discs attached to the turns of the primary and secondary bundles, so as to obturate the inner space of the bundles in a gas-tight way.

4. The device according to claim 1, wherein the inner space of said first portion of the primary exchanger, a so-called "combustion chamber", is obturated at one end by the first deflector plate and at its other end by a frontage provided with a gate crossed by said means for conveying or producing hot gases.

5. The device according to claim 1, wherein the inner space of the bundle of tubes which act as a secondary exchanger, a so-called "discharge chamber", is obturated at one end by the second deflector plate and is connected at its other end to said trunk for discharging the cooled gases.

6. The device according to claim 1, wherein both deflector plates and the discoidal deflecting ring are positioned parallel with each other on the one hand, and perpendicular to the axis X-X' of the helical winding of the bundles of tubes on the other hand.

7. The device according to claim 1, wherein the width of the interstice separating two adjacent turns of the bundles of tubes acting as a primary exchanger and as a secondary exchanger is constant and notably smaller than the thickness of the cross-section of the tubes making up these bundles.

8. The device according to claim 1, wherein the wall of the tubes of the bundles have a flattened and oval cross-section, the major axis of which is perpendicular or approximately perpendicular to that X-X' of the helix.

9. The device according to claim 1, wherein said housing is made in a heat-resistant plastic material, and said heat exchanger comprises mechanical means for restraining said bundles of coaxial tubes along their axial direction, such as a set of tie-rods positioned on the outside of the bundles, parallel to the axis X-X' of the helix and the ends of which are firmly attached to supporting elements applied against both opposite ends of these bundles placed end-to-end, these restraining means being capable of absorbing the thrust forces resulting from the internal pressure of the fluids which circulate in said tubes and which pressure tends to deform the walls thereof, by avoiding transmission of these forces to the housing.

10. The device according to claim 1, wherein said housing is made in a heat-resistant plastic material, and said heat exchanger comprises a cylindrical member positioned inside said housing and on the outside of the tube bundle acting as a primary exchanger, on a length at least extending facing the first portion of the primary exchanger, this cylindrical member ensuring a thermal screen function capable of insulating the housing from the heat emitted by the hot gases.

11. The device according to claim 1, wherein it comprises a second heat exchanger mounted in series with said condensing heat exchanger so that on the one hand, the primary fluid outlet of the condensing exchanger is connected to the inlet mouth of the primary circuit of the second exchanger and that the primary fluid outlet mouth of the second exchanger is connected to the primary fluid inlet of the condensing exchanger and that, on the other hand, the secondary fluid outlet of the condensing exchanger is connected to the inlet mouth of the secondary circuit of the second exchanger and the secondary fluid outlet mouth of the second exchanger is connected to the point for drawing said secondary fluid, the hot primary fluid circulating inside said second exchanger as a counter-current to the secondary fluid preheated in the condensing exchanger.

12. The device according to claim 11, wherein the second exchanger is an exchanger with plates.

13. A device for domestic production of a secondary fluid, such as hot sanitation water and of a primary fluid such as heating water, according to claim 11, which comprises a three-way valve, the first way of which is connected to the primary fluid outlet mouth of the second exchanger and the second way to the circulation means themselves connected to the inlet of the primary circuit of the condensing exchanger, and which also comprises a T-shaped fitting, two branches of which are respectively connected to the primary fluid outlet of the condensing exchanger and to the inlet mouth of the primary circuit of the second exchanger, the third way of the valve and the third branch of the T-shaped fitting being connectable to both ends of a heating water circulation network of, for example, central heating.

* * * * *